UNITED STATES PATENT OFFICE.

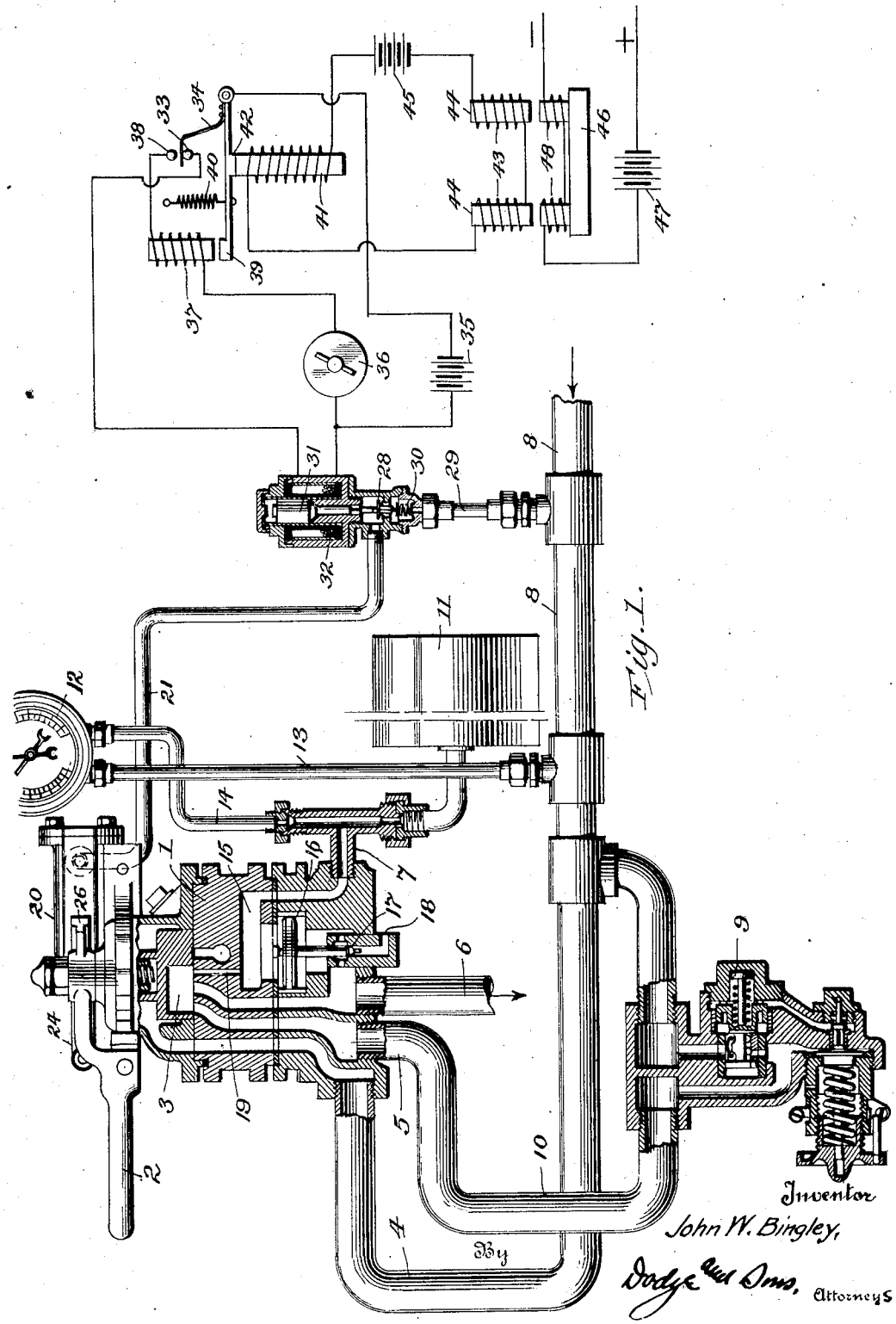

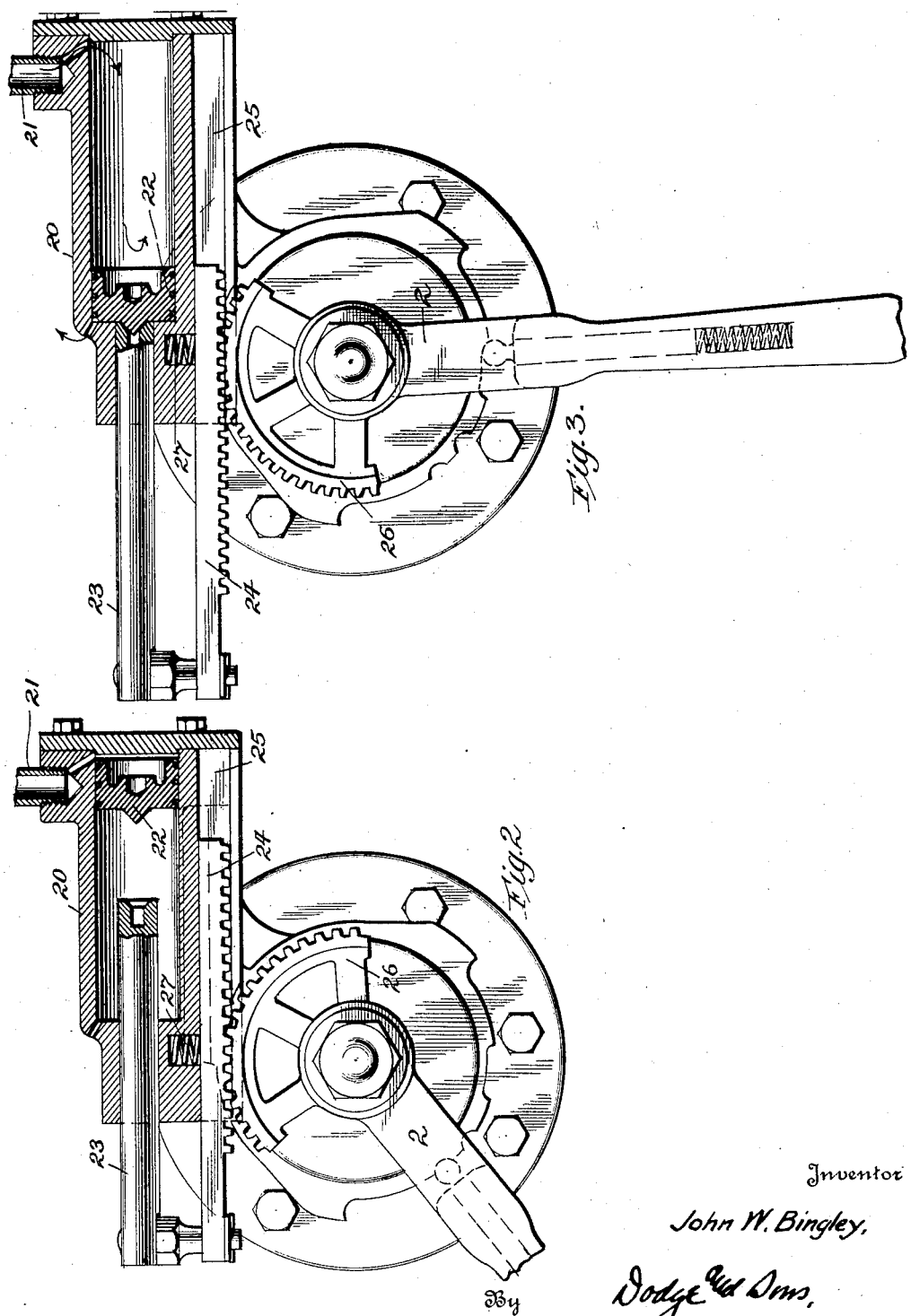

JOHN W. BINGLEY, OF WATERTOWN, NEW YORK.

SAFETY TRAIN-STOP MECHANISM.

1,363,557. Specification of Letters Patent. Patented Dec. 28, 1920.

Application filed November 22, 1916. Serial No. 132,872.

*To all whom it may concern:*

Be it known that I, JOHN W. BINGLEY, a citizen of the United States, residing at Watertown, in the county of Jefferson and State of New York, have invented certain new and useful Improvements in Safety Train-Stop Mechanisms, of which the following is a specification.

This invention relates to safety train stop mechanisms designed to be so related to railway signal systems and familiar types of automatic air brakes as to bring the train to rest by an application of the brakes in case the engineer should run past a signal set against him.

The device can be so arranged that the application is a service rather than an emergency application, and such an arrangement is the preferred form of the device.

The application is caused by a magnetically operated valve which admits main reservoir pressure or any other suitable fluid pressure to a fluid pressure motor so related to the engineer's brake valve as to move the same to service application position. This motor then operates to prevent the movement of the engineer's brake valve away from service position in the direction of running and release positions, and leaves the valve free to be moved to emergency position by the engineer. The electric valve above mentioned is actuated by an electromagnetic relay which last is brought into action by means of a track trip of the inductive type. This track trip includes a fixed electro-magnet on the track which is so connected with the signal system as to be energized or deënergized according to the position of a corresponding signal, together with an inductive coil or winding on the train and so positioned as to be carried by the movement of the train through the field of the fixed track magnet. The current induced in the inductive coil by such movement actuates the relay above mentioned.

The fluid motor mechanism for actuating the engineer's valve forms the subject matter of a co-pending application, Serial No. 132,873, filed November 22, 1916, entitled "Improvements in engineers' brake valves."

I illustrate a preferred embodiment of the invention in the accompanying drawings, in which:—

Figure 1 shows the system in diagram, the valve mechanisms being shown in section and the pipe connections, relay, and track trip mechanisms being represented in pure diagram.

Fig. 2 shows the fluid pressure motor applied to an engineer's brake valve, the cylinder and piston of the motor being shown in section. In this view the motor piston is shown in its normal retracted position and the engineer's valve in running position.

Fig. 3 is a view similar to Fig. 2, showing the piston at the forward limit of its motion with the valve forced to service application position and free to be moved farther for an emergency application by the engineer.

The invention may be applied to any usual type of air brake in which the brakes are applied by the movement of an engineer's brake valve. In the present case a familiar type of automatic system with an engineer's brake valve of the equalizing discharge type is illustrated so far as is necessary for an understanding of the invention.

The engineer's valve is provided with the usual casing 1 and operating handle 2, which is connected with the rotary valve 3 in the usual manner. The rotary valve 3 has the familiar functions corresponding to release, running, holding, lap, service and emergency positions, but the invention is applicable to valves having more or fewer positions. The use of the equalizing discharge feature is not essential to the invention.

The casing 1 is provided with the usual pipe connections. The main reservoir connection is shown at 4, the main feed connection at 5, the train pipe connection at 6, and the equalizing reservoir connection at 7. The main air pipe leading from the main reservoir (not shown) is illustrated at 8, and 9 represents any suitable type of pressure reducing feed valve interposed between the main air pipe 8 and the feed pipe 10. The equalizing reservoir is shown at 11. The duplex pressure gage 12 is connected by a pipe 13 to the main air pipe 8, and by a pipe 14 to the equalizing reservoir 11.

The equalizing reservoir 11 is connected with the equalizing chamber 15 above the equalizing piston 16, which is subject on its lower side to train pipe pressure. The piston 16 operates the equalizing discharge valve 17 which controls an exhaust or discharge port 18 leading from the train pipe to the atmosphere. The pressure in the chamber 15 is controlled by the valve 3 by its coaction with a port 19 in the seat of that valve.

Service applications are produced by reducing the pressure in the chamber 15, through the action of the valve 3. This causes the piston 16 to rise and vent train pipe pressure by the opening of valve 17 until the train pipe pressure falls slightly below the pressure in the chamber 15, when the valve 17 again closes the port 18 with the descent of the piston 16. The release, recharge and emergency application functions may be directly controlled by ports in the valve 3 in the usual manner.

The structure so far described is familiar to those skilled in the art and the details of this construction are not material to the present invention.

Mounted on the casing 1 of the engineer's valve is a cylinder 20, to the head end of which pressure may be admitted through a pipe 21. Mounted in the cylinder 20 is a free piston 22 which when moved away from the head end of the cylinder engages and moves a rod 23, which is connected to a rack 24 outside the cylinder 20 and guided in ways 25 formed in the cylinder casting. The rack 24 meshes with a sector gear 26 which is formed on or carried by the handle 2 of the engineer's brake valve. Thus, when the piston 22 is forced to make its full travel away from the head end of the cylinder 20 it moves the valve handle 2 toward application position, and the cylinder 20 is so proportioned that the full travel of the piston 22 will just move the valve handle 2 to a service application position. This is considered a distinct advantage, because an emergency application is unnecessary in most cases, and if necessary in any particular case can immediately be made by the engineer as the rod 23 is wholly free from the piston 22. If, however, it were desired to have the valve moved to emergency position and held there, this could readily be secured by a change in the proportions of the device. For example, by lengthening the travel of the piston 22 or by reducing the pitch radius of the sector gear 26, so that the latter will produce a greater rotation of valve stem for the same travel of the piston 22.

A thrust spring 27 may be placed behind the rack 24 to take up any looseness or lost motion, if desired. After the pressure has been released behind the piston 22 this may be forced back to its normal position, by moving the valve handle 2 to release position.

Pressure is admitted to the pipe 21 by means of a valve 28 controlling a connection 29 from the main air pipe 8. This valve is urged off its seat by main air pressure and by a spring 30. The valve is normally held closed by the downward thrust of an armature 31 which is drawn down by an electromagnet 32. In the normal operative position the magnet 32 is energized thus holding the valve 28 closed. Pressure behind piston 22 is relieved by leakage around the piston, and this leakage is purposely made sufficient for this purpose.

One terminal of the windings of the magnet 32 is connected to a contact 33 with which a switch arm 34 contacts when in its lower position. The other terminal of the magnet has two connections, the first of which is a constant connection and the second a shunt to cut out magnet 31. The first connection is through the battery 35 to the switch arm 34. The shunt connection is through the manually operated, normally closed switch 36 and the electro-magnet 37 to a contact 38 with which the switch arm 34 contacts when in its upper position. The electro-magnet 37 is energized by such contact and holds the arm 34 in its upper position by attracting an armature 39 attached to that switch arm. The arm 34 is urged upward by a spring 40 for which a weight may be substituted if preferred. During normal running condition the switch arm 34 is held down by an electromagnet 41 coacting with an armature 42, the magnet 41 being in circuit with the inductive windings 43 which have iron cores 44. The magnet 41 and windings 43 are in circuit with a battery or other source of current 45.

The windings 43 and their cores 44 are mounted on the train so as to be carried thereby past and close to an electromagnet 46 fixed beside the track and adapted to be energized so as to produce a strong magnetic field whenever an associated signal is set against the passage of the train. The exact form of this electromagnet is not material and types are now familiar one of which operates on open and the other on closed circuit, the latter being usually preferable because derangement of the circuit will cause stoppage of the train. The drawing may represent either.

For open circuit operation 46 would be the soft iron core of an ordinary electromagnet whose windings 48 would be in circuit with a battery 47, the circuit being closed by the signal when the latter is set to stop position, by means of any suitable switch (not shown).

For closed circuit operation 46 would be a permanent magnet with soft iron pole pieces carrying the windings 48. The windings 48 would be in circuit with battery 47 the circuit being opened by the signal, by any suitable switch (not shown), when the signal is set to stop position. In all clear positions of the signal the circuit would be closed so that the field created by the windings 48 would neutralize the permanent field of the permanent magnet.

It is to be noted that both devices are essentially electromagnets, and in each case I consider such electromagnet to be energized when an effective field is created and deënergized when the effective field is destroyed. I use the terms in this sense in the present specification and claims such use being warranted by the admitted functional equivalence of the two devices.

Under ordinary running conditions the magnet 46 is not energized. Under these circumstances, the magnet 41 would be not affected by the magnet 46 and would hold the switch arm 44 in its lower position, thus energizing the magnet 32 and preventing the admission of air behind the piston 22. Should the signal corresponding to the magnet 46 be set against the engineer, the magnet 46 is energized. When the inductive windings 43 are moved through the field of the magnet 46 by the passage of the train, the battery 45 is momentarily over-powered and the magnet 41 releases the armature 42. The switch arm 34 then moves to its uppermost position under the action of the spring 40, deënergizes the magnet 32 and allows valve 28 to open to admit pressure behind the piston 22 to move the engineer's brake valve to service position. At the same time the arm 34 touches contacts 38 and energizes magnet 37 thus holding the switch arm 34 in its upper position indefinitely. To restore the device to running condition, switch 36 is opened. The magnet 41 restores the relay to its normal position with the arm 34 against the contact 33. Switch 36 is then closed and the device is again in running condition. Switch 36 is preferably put in a position which is inaccessible when the train is in motion, so as to require stopping of the train before the brakes can be released.

While the structure described is preferred, it is subject to modification. Since there are only two conditions of the stop mechanism 1, normal running condition, and 2, automatic stop condition, either of these may be made to correspond to either of the two possible conditions in any part of the electric circuit which conditions are open circuit and closed circuit. As a rule it is desirable to have normal running condition depend upon closed circuit, for then any failure of the circuit will cause application of the brakes and call attention to the situation. Such an arrangement is shown with reference to magnet valve 28 which is held closed when the magnet is energized. Both of these arrangements of electrical control circuits are known to those skilled in the art, and the present invention is not confined to either, except as specified in the claims.

Having thus described my invention, what I claim is:—

1. The combination of an automatic train brake mechanism including an engineer's brake valve; a pressure motor operatively connected with said valve to move the latter to application position; a valve connected to admit pressure fluid to said motor; an electro-magnet operating when energized to hold said valve closed; a relay switch having a contactor connected through a current source to one terminal of said magnet; a pair of contacts for said contactor the first connected to the other terminal of said magnet and the second connected to a shunt around said magnet, said shunt including a second electro-magnet for holding said contactor against said second contact when the circuit is closed through the shunt; means constantly urging said contactor toward said second contact; a second closed circuit including inductive windings; a current source and a third electro-magnet for normally holding said contactor against said first contact, all the parts so far named being mounted on the train; and a fixed electro-magnet mounted on the track near the path of said inductive windings, capable of being energized and deënergized, and when energized operative to induce a neutralizing current for deënergizing said electro-magnet to release said contactor and allow it to contact with said second contact.

2. The combination of an automatic train brake mechanism including an engineer's brake valve; a pressure motor operatively connected with said valve to move the latter to service application position while permitting manual movement to emergency application position; a valve connected to admit pressure fluid to said motor; an electro-magnet operating when energized to hold said valve closed; a relay switch having a contactor connected through a current source to one terminal of said magnet; a pair of contacts for said contactor the first connected to the other terminal of said magnet and the second connected to a shunt around said magnet, said shunt including a second electromagnet for holding said contactor against said second contact when the circuit is closed through the shunt; means constantly urging said contactor toward said second contact; a second closed circuit including inductive windings, a current source and a third electro-magnet for normally holding said contactor against said first contact, all the parts so far named being mounted on the train; and a fixed electro-magnet mounted on the track near the path of said inductive windings, capable of being energized and deënergized, and when energized operative to induce a neutralizing current for deënergizing said electro-magnet to release said contactor and allow it to contact with said second contact.

3. The combination of an automatic train brake mechanism including an engineer's brake valve; a pressure motor operatively connected with said valve to move the latter to application position; a valve connected to admit pressure fluid to said motor; an electro-magnet operating when energized to hold said valve closed; a relay switch having a contactor connected through a current source to one terminal of said magnet; a pair of contacts for said contactor the first connected to the other terminal of said magnet and the second connected to a shunt around said magnet, said shunt including a second electro-magnet for holding said contactor against said second contact when the circuit is closed through the shunt; means constantly urging said contactor toward said second contact; a second closed circuit including inductive windings, a current source and a third electro-magnet for normally holding said contactor against said first contact, all the parts so far named being mounted on the train; a fixed electro-magnet mounted on the track near the path of said inductive windings, capable of being energized and deënergized and when energized operative to induce a neutralizing current for deënergizing said electromagnet to release said contactor and allow it to contact with said second contact; and a normally inaccessible manually operable switch for breaking said shunt connection to permit the third electro-magnet to restore said contactor to normal position after actuation.

In testimony whereof I have signed my name to this specification.

JOHN W. BINGLEY.